(12) United States Patent
Takahashi et al.

(10) Patent No.: US 7,859,592 B2
(45) Date of Patent: Dec. 28, 2010

(54) TELEVISION LENS APPARATUS

(75) Inventors: Satoshi Takahashi, Saitama (JP); Shozo Kondo, Tokyo (JP)

(73) Assignees: Fujinon Corporation, Saitama (JP); Fujifilm Corporation, Tokyo (JP)

( * ) Notice: Subject to any disclaimer, the term of this patent is extended or adjusted under 35 U.S.C. 154(b) by 641 days.

(21) Appl. No.: 11/984,032

(22) Filed: Nov. 13, 2007

(65) Prior Publication Data

US 2008/0111914 A1 May 15, 2008

(30) Foreign Application Priority Data

Nov. 14, 2006 (JP) .............................. 2006-308189

(51) Int. Cl.
*H04N 5/225* (2006.01)

(52) U.S. Cl. ................... 348/373; 348/374; 348/375; 348/376; 348/370; 396/71; 396/448

(58) Field of Classification Search ................... None
See application file for complete search history.

(56) References Cited

U.S. PATENT DOCUMENTS 5,294,988 A * 3/1994 Wakabayashi et al. ...... 348/373

FOREIGN PATENT DOCUMENTS

| JP | 2005-352281 A | 12/2005 |
| JP | 2005352281 A * | 12/2005 |

* cited by examiner

*Primary Examiner*—Jason Chan
*Assistant Examiner*—Yih-Sien Kao
(74) *Attorney, Agent, or Firm*—Birch, Stewart, Kolasch & Birch, LLP

(57) ABSTRACT

According to an aspect of the present invention, at least parts or all of the windows for tarry lamps are located in the outside of the front cover by constructing the front cover portion between the top face and left-hand side face of the front cover, and the front cover portion between the top face and right-hand side face of the front cover as the inclined planes respectively. That is, since the windows for tarry lamps are not covered by the front cover as conventional ones, visibility from the external improves.

14 Claims, 8 Drawing Sheets

TELEVISION LENS APPARATUS

BACKGROUND OF THE INVENTION

1. Field of the Invention

The present invention relates to a television lens apparatus, and in particular, to a television lens apparatus in which tarry lamps turned on according to an operation status of a television camera which is connected to the television lens apparatus are provided.

2. Description of the Related Art

In television image pickup in studios, outdoor sport relay broadcast, and the like, box-type television lens apparatuses called EFP lens apparatuses are used widely (Japanese Patent Application Laid-Open No. 2005-352281). As illustrated in FIG. 15, a television lens apparatus 10' described in Japanese Patent Application Laid-Open No. 2005-352281 is equipped with a lens body 12' and a lens cover 14'. The lens cover 14' is for surrounding the lens body 12', and is constructed by attaching a rear end face of a square-barrel front cover 16' to a front end face of square-barrel body cover 18'.

Luminous bodies (not illustrated), such as LEDs turned on according to an operation status of the television camera connected to the television lens apparatus 10', are provided on an outer peripheral surface of the lens body 12'. These luminous bodies face the red transparent plates 20' and 22' covering aperture sections provided on the front end face and both side faces of the body cover 18'. Camera persons, subject persons such as casters, staffs engaging in image pickup, and the like will grasp that the television camera connected to the television lens apparatus is under an image pickup operation by visually identifying light emission of the luminous bodies from the external through the red transparent plates 20' and 22'.

SUMMARY OF THE INVENTION

Nevertheless, in the television lens apparatus 10' described in Japanese Patent Application Laid-Open No. 2005-352281, red transparent plates 20' and 22' are provided only on the front end face and both side faces of the body cover 18', and hence, there is an issue that it is hard to visually identify light emission of the luminous bodies when camerapersons and the like are located in positions other than a subject side and both the side faces. In particular, since the red transparent plate 20' provided on the front end face of the body cover 18' is covered by the front cover 16', it is hard to visually identify a luminous body through the red transparent plate 20' provided on this front end face.

The present invention has been made in view of such a situation, and aims at providing a television lens apparatus which can improve visibility of luminous bodies (tarry lamps).

An invention according to a first aspect is a television lens apparatus comprising: a lens cover equipped with a front cover which is a barrel equipped with a top face, a bottom face, a left-hand side face, and a right-hand side face, and a body cover which is a barrel in which respective apertures are formed in an upper left corner section and an upper right corner section in a front end side; windows for tarry lamps which cover the apertures; and luminous bodies which are provided in an outer peripheral surface of a lens body from which the lens cover is detached and attached, and are visually identified through the windows for tarry lamps, characterized in that at least parts or all of the windows for tarry lamps are located in an outside of the front cover by making a front cover portion between the top face and left-hand side face of the front cover, and a front cover portion between the top face and right-hand side face of the front cover be inclined planes respectively.

According to the invention of the first aspect, at least parts or all of the windows for tarry lamps are located in the outside of the front cover by constructing the front cover portion between the top face and left-hand side face of the front cover, and the front cover portion between the top face and right-hand side face of the front cover as the inclined planes respectively. That is, since the windows for tarry lamps are not covered by the front cover as conventional ones, visibility from the external improves.

An invention according to a second aspect is characterized in that the windows for tarry lamps are colored transparent plates arranged aslant in the invention according to the first aspect.

According to the invention of the second aspect, since the windows for tarry lamps are arranged aslant, the visibility from the external improves also by this.

An invention according to a third aspect is characterized in that the windows for tarry lamps include a colored transparent plate flush with the top face of the body cover, colored transparent plates flush with the side faces of the body cover, and a colored transparent plate flush with the front face of the body cover in the invention according to the first aspect.

According to the invention of the third aspect, since the windows for tarry lamps include the colored transparent plates flush with the top face of the body cover, the colored transparent plates flush with the side faces of the body cover, and the colored transparent plates flush with the front face of the body cover, the visibility from the external improves also by this.

An invention according to a fourth aspect, is characterized in that handle sections protruded inside the body cover are provided in sides of the body cover respectively, and that the luminous bodies are provided in positions in which the luminous bodies do not interfere the handle sections when the cover is detached from or attached to the lens body, in the invention according to any one of the first to third aspects.

According to the invention of the fourth aspect, it is possible to prevent the luminous bodies and the luminous body supporting sections from interfering with the handle sections when detaching and attaching the body cover to the lens body.

An invention according to a fifth aspect is characterized in that luminous body supporting sections which have luminous body mounting surfaces approximately parallel to the windows for tarry lamps are provided on an outer peripheral surface of the lens body, and that the luminous bodies are mounted on the luminous body mounting surfaces.

According to the invention of the fifth aspect, since luminescent surfaces of the luminous bodies which are mounted on the luminous body mounting surface, and the windows for tarry lamps are parallel to each other, it is possible to visually identify uniform light emission from the external.

An invention according to a sixth aspect is characterized by further comprising reflectors which are provided on an outer peripheral surface of the lens body near the luminous bodies and are used for reflecting light emission of the luminous bodies to the windows for tarry lamps.

According to the invention of the sixth aspect, it is possible to visually identify uniform light emission from the external even if the luminescent surfaces of the luminous bodies and the windows for tarry lamps are not parallel to each other.

According to the present invention, it becomes possible to provide the television lens apparatus which can improve the visibility of the luminous bodies.

DETAILED DESCRIPTION OF THE PREFERRED EMBODIMENTS

Hereafter, a television lens apparatus which is a first embodiment of the present invention will be described with referring to drawings.

Figure 1:
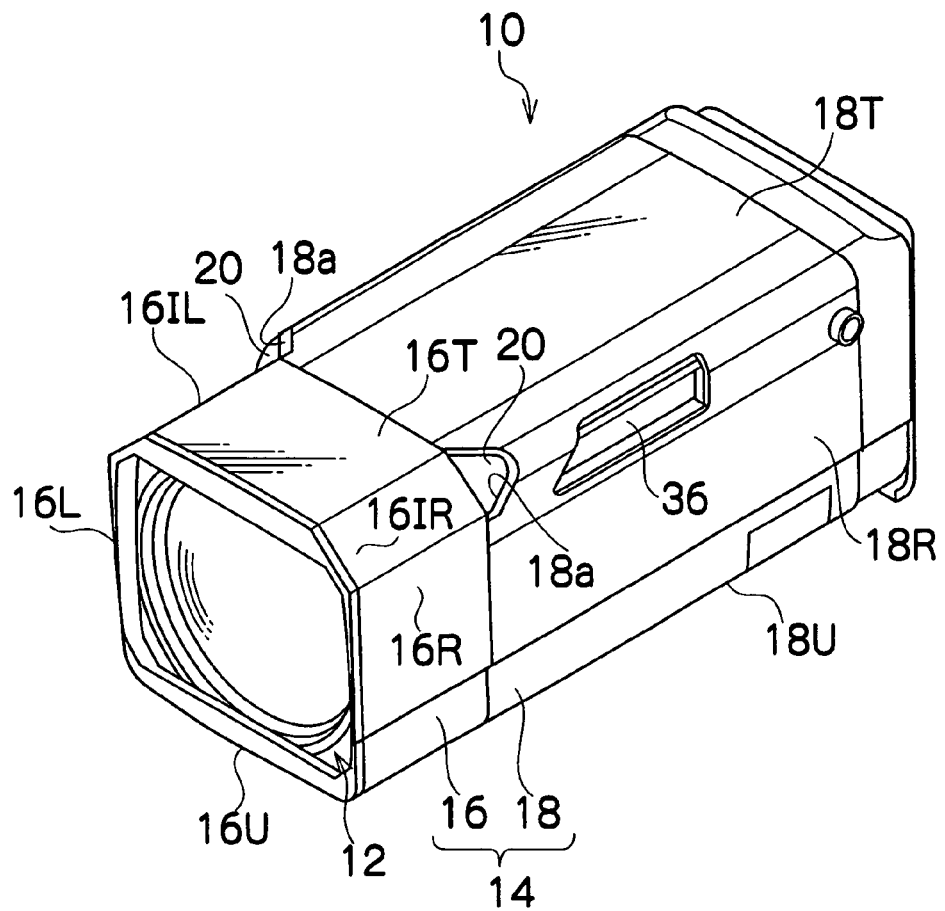
FIG. 1 shows a perspective view illustrating whole structure of an EFP lens apparatus 10 to which a television lens apparatus which is a first embodiment of the present invention is applied.
Figure 2:
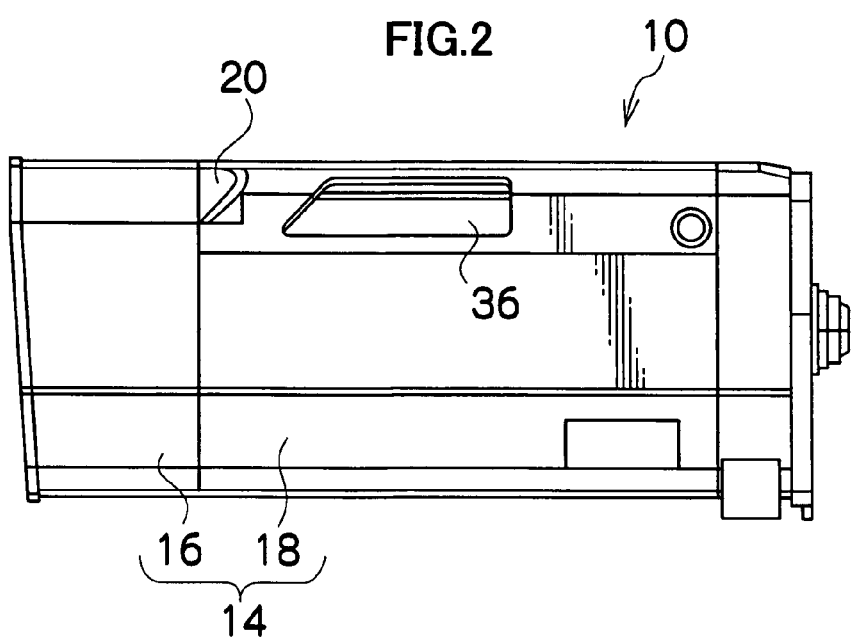
FIG. 2 shows a side view of the EFP lens apparatus 10 in FIG. 1.
Figure 3:
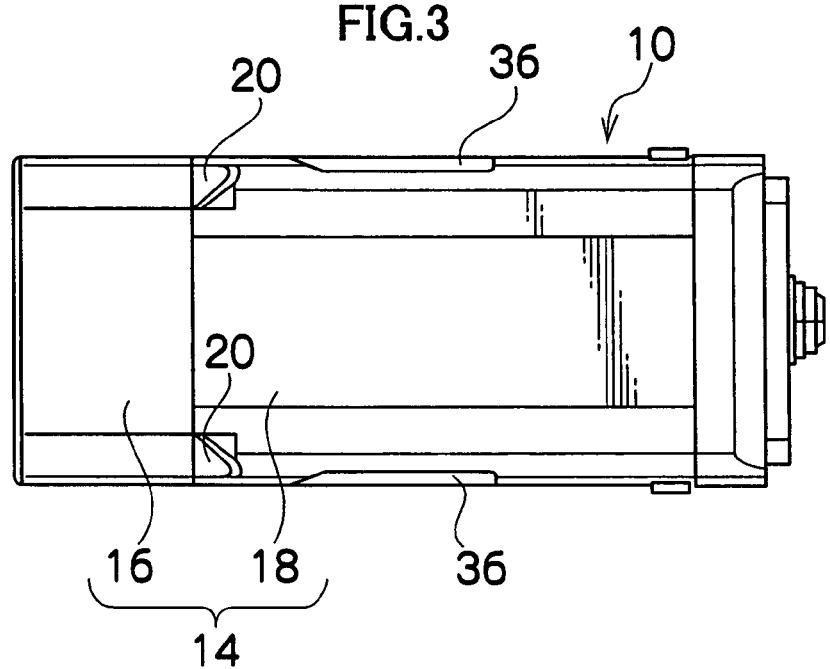
FIG. 3 shows a top view of the EFP lens apparatus 10 in FIG. 1.
Figure 4:
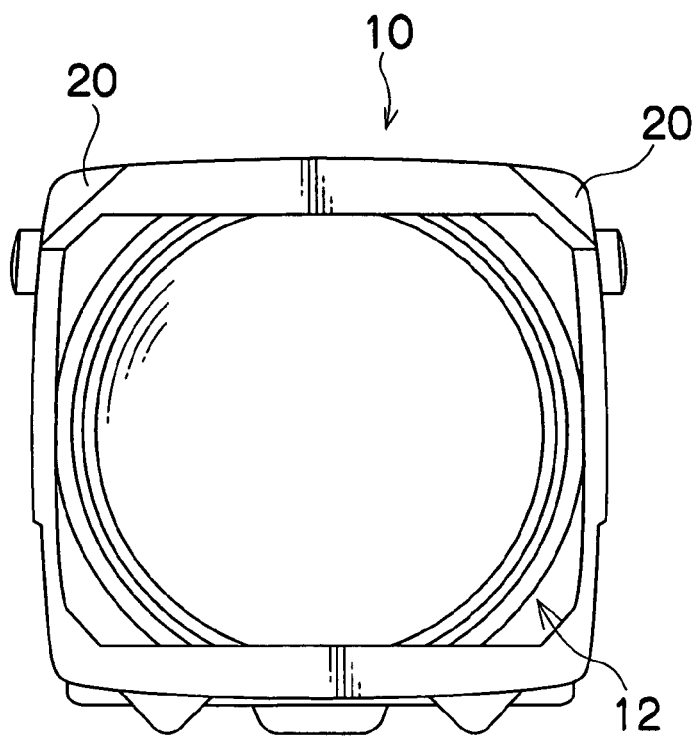
FIG. 4 shows a front view of the EFP lens apparatus 10 in FIG. 1.

FIG. 1 is a perspective view illustrating whole structure of an EFP lens apparatus 10 to which the television lens apparatus which is the first embodiment of the present invention is applied. FIG. 2 is a side view of the EFP lens apparatus 10 in FIG. 1. FIG. 3 is a top view of the EFP lens apparatus 10 in FIG. 1. FIG. 4 is a front view of the EFP lens apparatus 10 in FIG. 1.

As illustrated in FIG. 1 through FIG. 4, the EFP lens apparatus 10 is mainly equipped with a lens body 12, a lens cover 14 which surrounds this lens body 12, a mount section for mounting a camera apparatus, and the like. The lens cover 14 is constructed with combining a front cover 16 and a body cover 18.

The front cover 16 is a barrel which is equipped with a top face 16T, side faces 16R and 16L, and a bottom face 16U. The top face 16T and the side face 16R are continuous through an inclined plane 16IR, and the top face 16T and the side face 16L are continuous through an inclined plane 16IL similarly. In addition, the inclined planes 16R and 16L are not limited to planes. For example, they may be circular arcs or curved surfaces where circular arcs continue, or ones where concavo-convex processing or the like is performed on their surfaces of planes or curved surfaces.

The body cover 18 is a barrel with a square barrel shape which is equipped with a top face 18T, side faces 18R and 18L, a bottom face 18U, a front end face (not illustrated), and the like. An aperture (not illustrated) through which the lens body 12 is inserted is formed in the front end face of the body cover 18. The body cover 18 is in a state that (a triangular pyramid portion of) an upper left corner section and (a triangular pyramid portion of) an upper right corner section are cut off in the front end side. That is, the triangular apertures 18a and 18a are formed in an upper left corner section and an upper right corner section in the front end side of the body cover 18. These apertures 18a and 18a are covered by the windows 20 for tarry lamps which are triangular transparent plates arranged aslant. The windows 20 for tarry lamps are red transparent plates formed with, for example, a synthetic resin. The lens cover 14 is constructed by combining a rear end face of the front cover 16 with a front end face of the body cover 18. In addition, the windows 20 for tarry lamps are not limited to planes. For example, they may be plates having circular arcs or curved surfaces where circular arcs continue, or ones where concavo-convex processing or the like is performed on their surfaces of planes or plates having curved surfaces.

Figure 5:
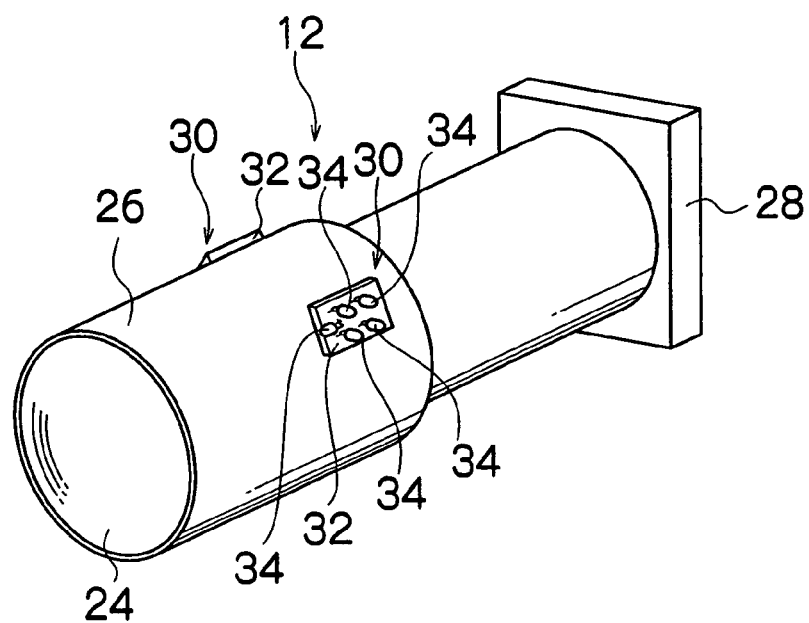
FIG. 5 shows a perspective view of a lens body 12.

As illustrated in FIG. 5, the lens body 12 is equipped with a lens barrel 26 in which a lens 24 is contained, a mount frames 28 to which a rear end of this lens barrel 26 is attached, and the like.

Figure 6:
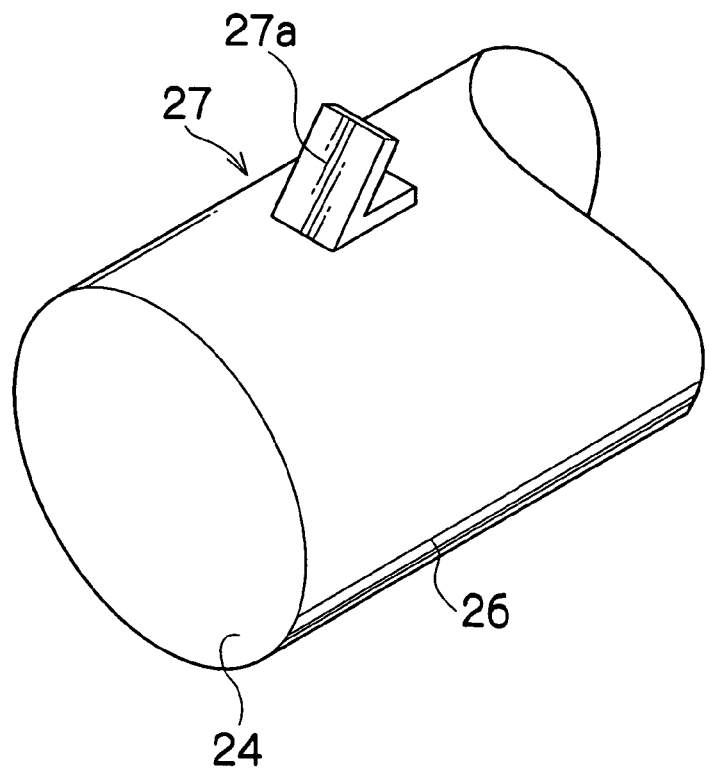
FIG. 6 shows a diagram for describing a luminous body supporting section 27 to which a luminous body 30 is mounted.

As illustrated in FIG. 6, a luminous body supporting section 27 which has a luminous body mounting surface 27a where the luminous bodies 30 are mounted is provided on an outer peripheral surface of the lens barrel 26. The luminous body mounting surface 27a is approximately parallel to the windows 20 for tarry lamps, and when the lens cover 14 is mounted on the lens body 12, positional relation between the luminous body mounting surface 27a and the windows 20 for tarry lamps becomes to be illustrated in FIG. 7. Thereby, it becomes possible to visually identify light emission of the luminous bodies 30 from the external through the windows 20 for tarry lamps. In addition, since a luminescent surface (the luminescent surface is formed of heads of a plurality of light-emitting diodes 34 in a luminous body 30 illustrated in FIG. 5) of the luminous body 30 which is mounted on the luminous body mounting surface 27a, and a window 20 for a tarry lamp are constructed parallel, it is possible to visually identify uniform light emission from the external.

As described above, in the television lens apparatus of this embodiment, at least parts or all of the windows 20 for tarry lamps are located in an outside of the front cover 16 by constructing a front cover portion between the top face 16T and the right-hand side face 16R of the front cover 16, and a front cover portion between the top face 16T and the left-hand side face 16L of the front cover 16 as an inclined plane 16IR and an inclined plane 16IL, respectively. That is, since the windows 20 for tarry lamps are not covered by the front cover as conventional ones, visibility from the external improves. Furthermore, since the windows 20 for tarry lamps incline, the visibility from the external improves also by this.

In addition, it is possible to adopt various kinds of ones, such as LEDs and incandescent lamps, as the luminous bodies 30. In this embodiment, as illustrated in FIG. 5, ones where a plurality of light-emitting diodes 34 (five light-emitting diodes are illustrated in the diagram) is implemented on an electronic circuit board 32 (Japanese Patent Application Laid-Open No. 2005-352281) are adopted as the luminous bodies 30.

Figure 7:
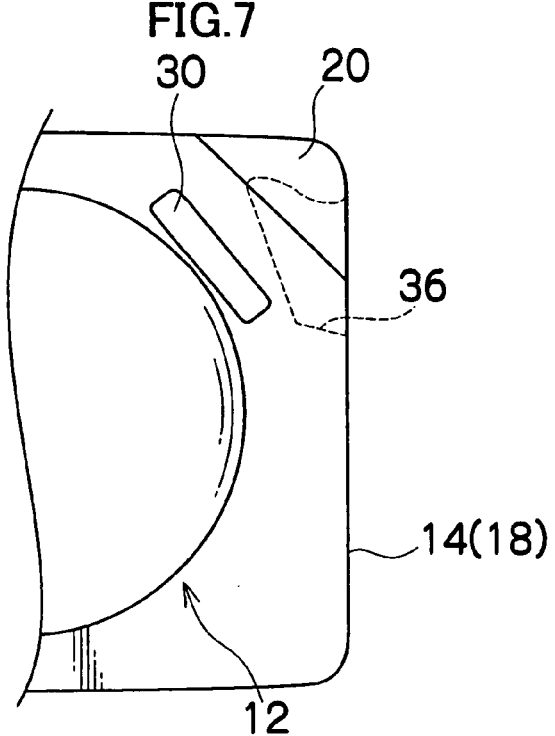
FIG. 7 shows a diagram for describing positional relation between an luminous body mounting surface 27a and windows 20 for tarry lamps.
Figure 8:
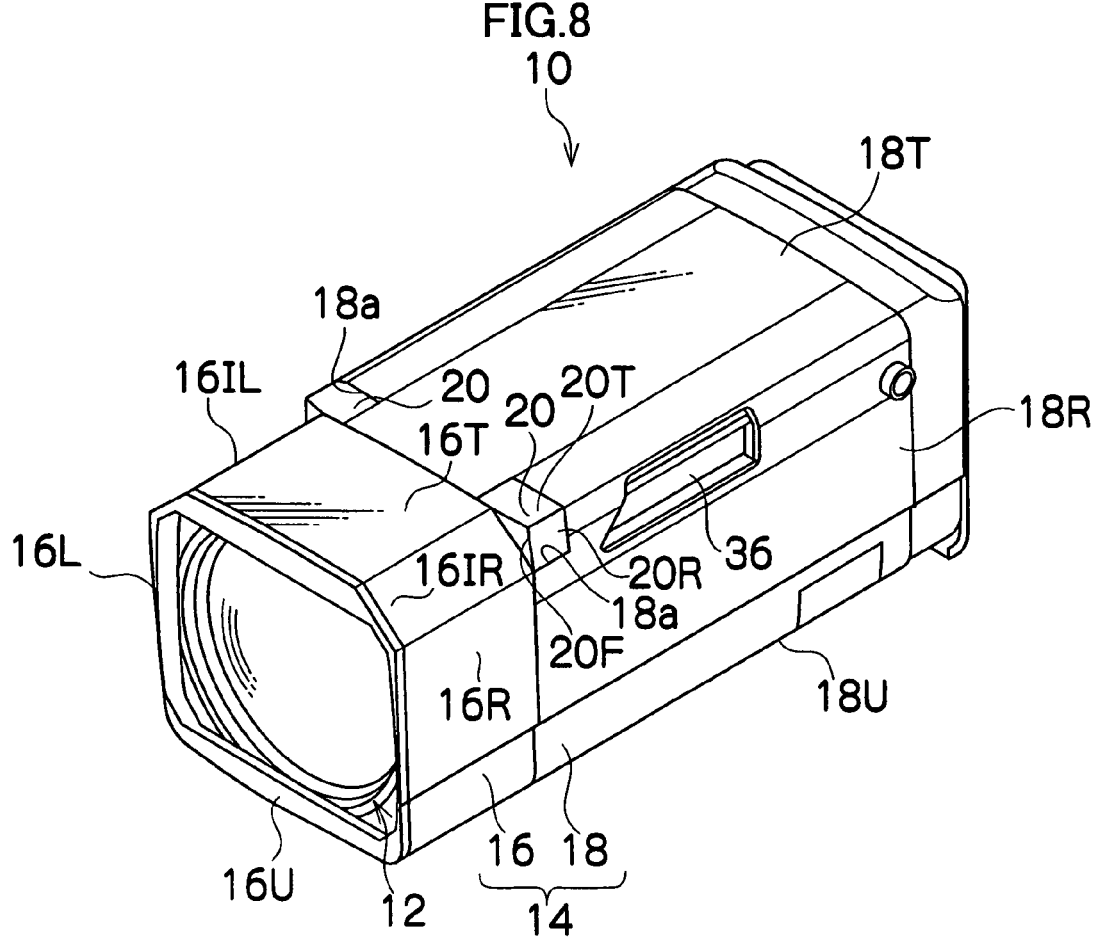
FIG. 8 shows a perspective view illustrating a modified example of the television lens apparatus which is the first embodiment of the present invention.
Figure 9:
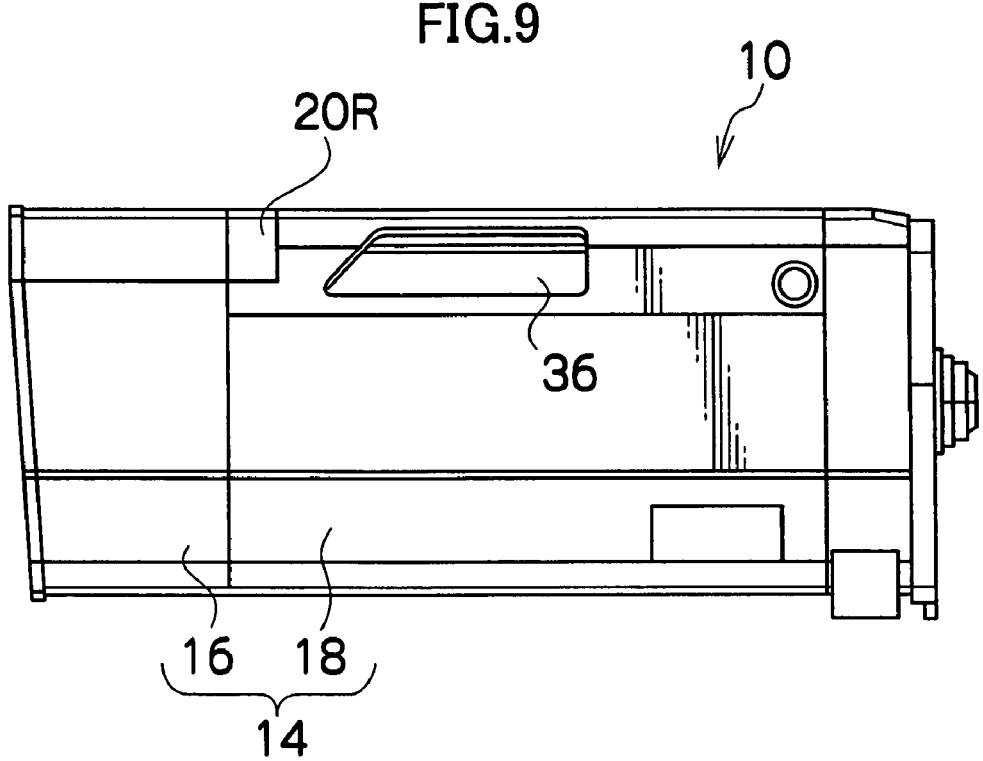
FIG. 9 shows a side view of the EFP lens apparatus 10 in FIG. 8.
Figure 10:
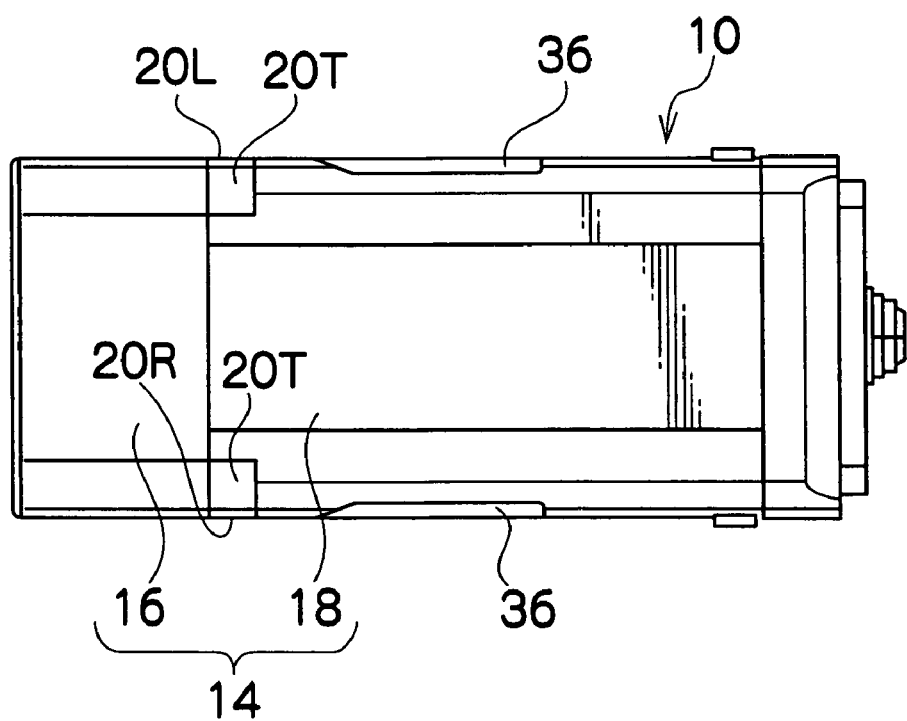
FIG. 10 shows a top view of the EFP lens apparatus 10 in FIG. 8.
Figure 11:
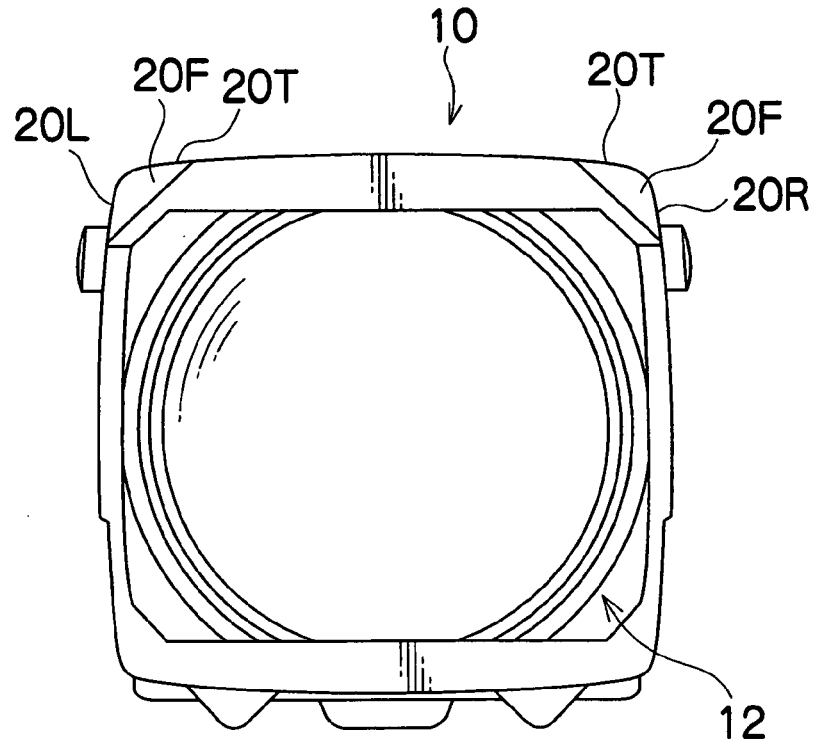
FIG. 11 shows a front view of the EFP lens apparatus 10 in FIG. 8.

Furthermore, since respective handle sections 36 protruding to an inside of the body cover 18 are provided in both side faces of the body cover 18, when detaching and attaching the body cover 18 to the lens body 12, there is a possibility that the luminous bodies 30 and the luminous body supporting sections 27 may interfere with the handle sections 36. In order to prevent this, as illustrated in FIG. 7, the luminous bodies 30 (and the luminous body supporting sections 27) may be provided in, for example, positions where they do not interfere with the handle sections 36.

Next, a modified embodiment will be described.

Although the windows 20 for tarry lamps are described as the triangular transparent plates, arranged aslant, in the above-mentioned embodiment, the present invention is not limited to this. For example, the windows 20 for tarry lamps may be also ones which include a transparent plate 20T flush with the top face 18T of the body cover 18, transparent plates 20R and 20L flush with the side faces 18R and 18L of the body cover 18, and a transparent plate 20F flush with the front end face of the body cover 18, as illustrated in FIG. 8 through FIG. 11. In addition, the respective transparent plates 20T, 20R, 20L, and 20F are not limited to planes. For example, they may be plates having circular arcs or curved surfaces where circular arcs continue, or ones where concavo-convex processing or the like is performed on their surfaces of planes or plates having curved surfaces.

Since these windows 20 for tarry lamps are not covered by the front cover as conventional ones, visibility from the external improves. Furthermore, since these windows 20 for tarry lamps include the transparent window 20T flush with the top face 18T of the body cover 18, the transparent plates 20R and 20L flush with the side faces 18R and 18L of the body cover 18, and the transparent plate 20F flush with the front face of the body cover 18, the visibility from the external improves also by this.

Figure 12:
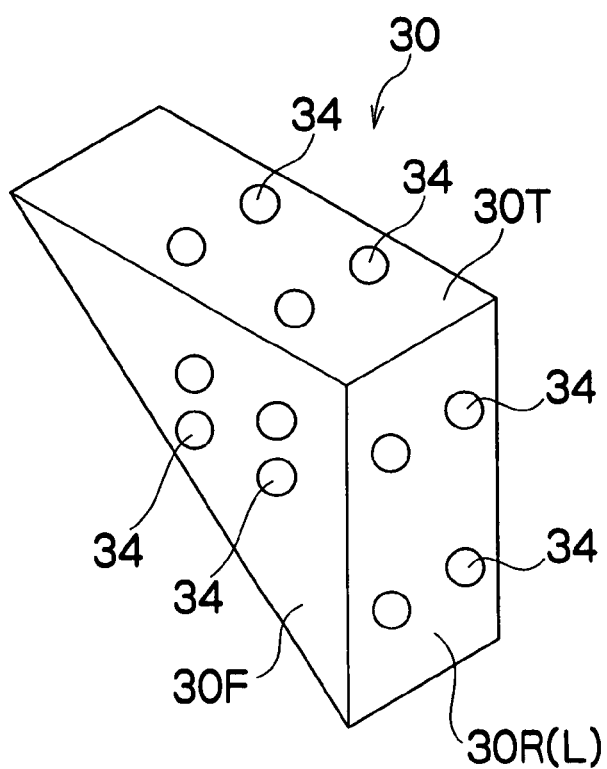
FIG. 12 shows a diagram for describing a modified example.

Also in the case of the windows 20 for tarry lamps in this construction, the luminous bodies 30 same as described in the first embodiment may be mounted on the luminous body mounting surfaces 27, but the present invention is not limited to this. For example, as illustrated in FIG. 12, ones being equipped with a luminescent surface 30T which is a face, where an LED 34 and the like are mounted, and is approximately parallel to the top face 18T of the body cover 18, luminescent surfaces 30R and 30L which are faces, where LEDs 34 and the like are mounted, and are approximately parallel to the side faces 18R and 18L of the body cover 18, and a luminescent surface 30F which is a face, where an LED 34 and the like are mounted, and is approximately parallel to the front end face of the body cover 18 may be adopted as the luminous bodies 30.

Figure 13:
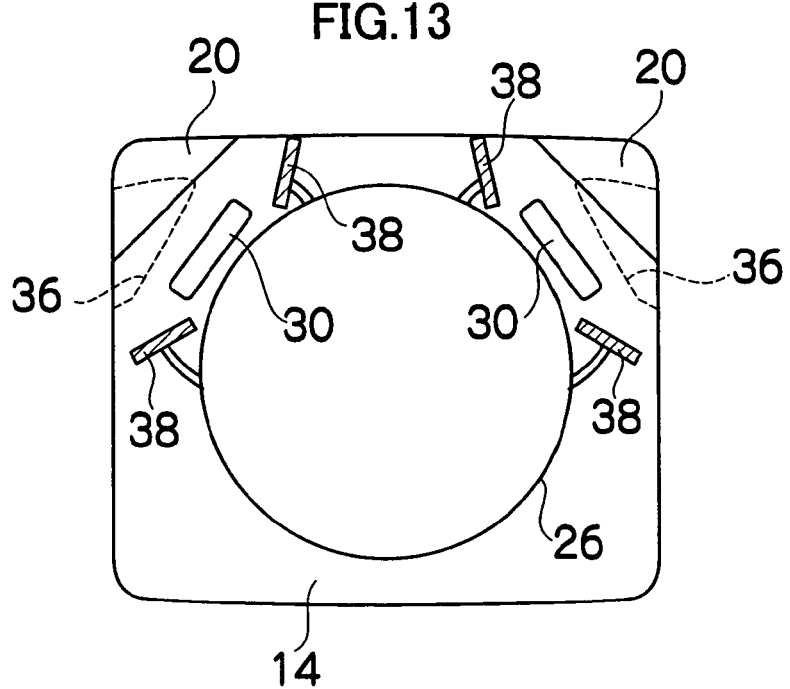
FIG. 13 shows a diagram for describing a modified example.
Figure 14:
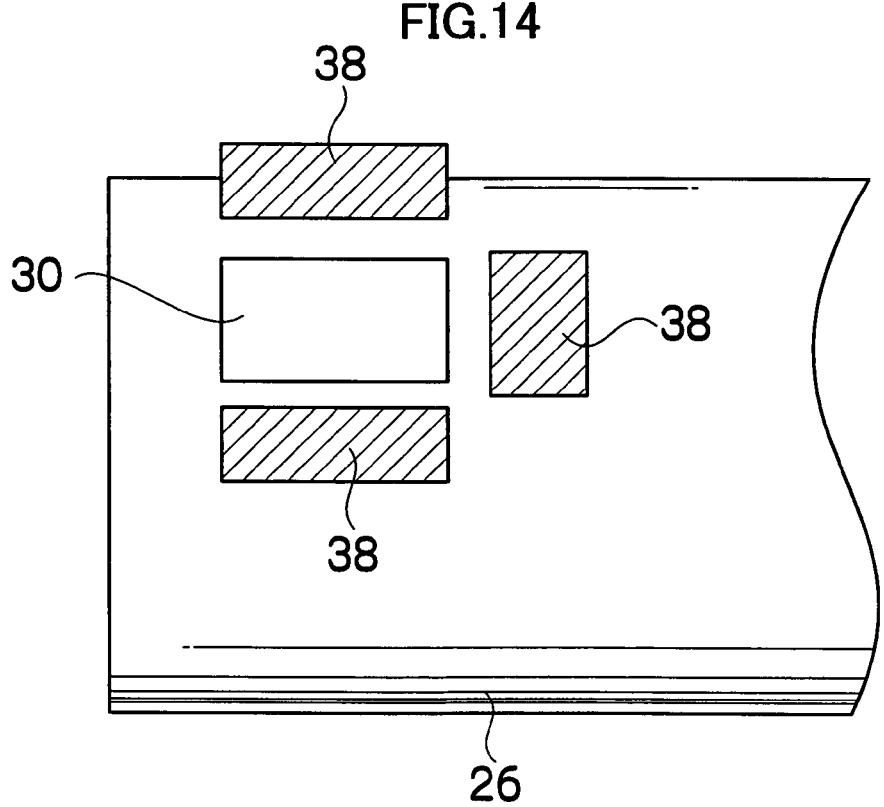
FIG. 14 shows a diagram for describing a modified example.
Figure 15:
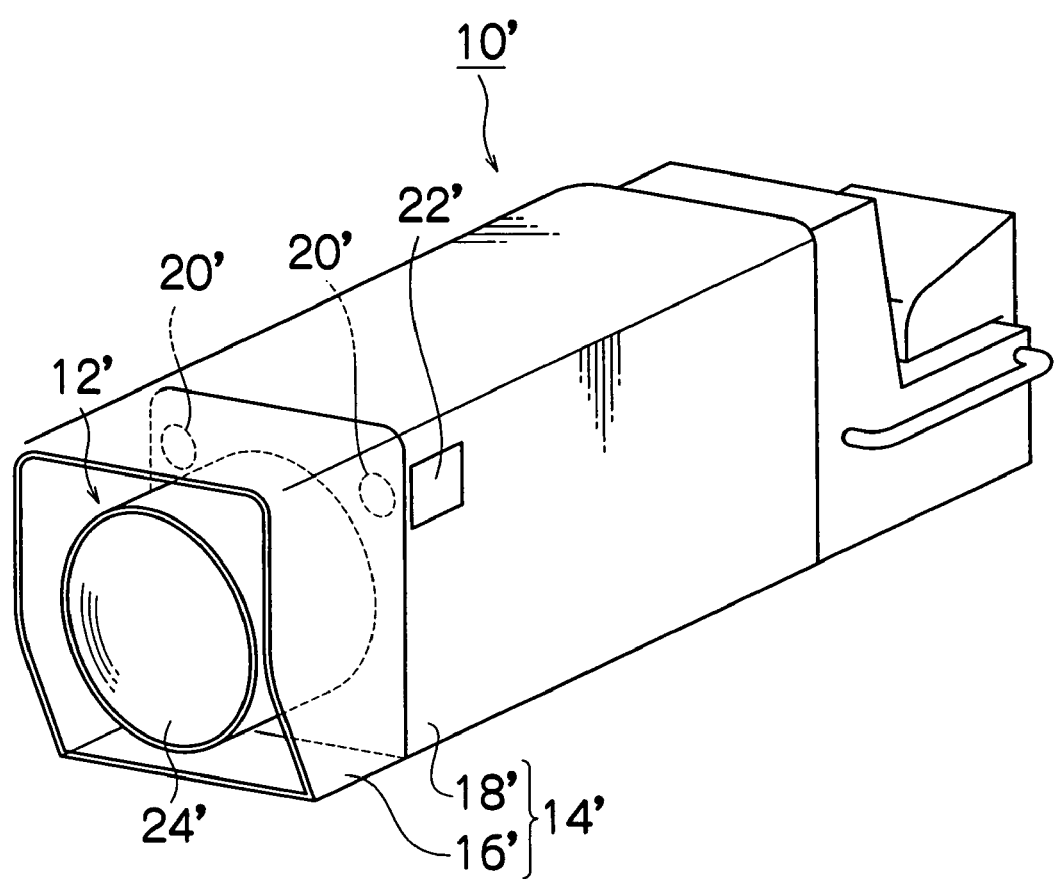
FIG. 15 shows a diagram for describing a conventional example.

In addition, in the above-mentioned embodiment, it is described that the luminous bodies 30 (and the luminous body supporting sections 27) are provided in positions where they do not interfere with the handle sections 36 so as to prevent that the luminous bodies 30 (and the luminous body supporting sections 27) interfere with the handle sections 36 when detaching and attaching the body cover 18 to the lens body 12. It becomes impossible in this case, to maintain the parallelism between the luminous body mounting surfaces 27a and the windows 20 for tarry lamps depending on the positions in which the luminous bodies 30 (and the luminous body supporting sections 27) are provided. In this case, since the luminescent surface (the luminescent surface is formed of heads of a plurality of light-emitting diodes 34 in the luminous body 30 illustrated in FIG. 5) of the luminous body 30 which is mounted on the luminous body mounting surface 27a, and the window 20 for a tarry lamp are not parallel, light emission visually identified from the external becomes ununiform. In order to prevent this, as illustrated in FIG. 13 and FIG. 14, it is also sufficient to provide reflectors 38, such as mirrors for reflecting light emission of the luminous bodies 30 toward the windows 20 for tarry lamps, in an outer peripheral surface of the lens barrel 26 near the luminous bodies 30. Thereby, it is possible to visually identify uniform light emission from the external even if the luminescent surfaces of the luminous bodies 30 and the windows 20 for tarry lamps are not parallel to each other.

The above-mentioned embodiments are only mere exemplification at all points. The present invention is not restrictively interpreted by these descriptions. The present invention can be performed in other various forms without deviating from its spirit or main features.

What is claimed is:

1. A television lens apparatus comprising:
    a lens cover equipped with a front cover which is a barrel equipped with a top face, a bottom face, a left-hand side face, and a right-hand side face, and a body cover which is a barrel in which respective apertures are formed in an upper left corner section and an upper right corner section in a front end side;
    windows for tarry lamps which cover the apertures; and
    luminous bodies which are provided in an outer peripheral surface of a lens body from which the lens cover is detached and attached, and are visually identified through the windows for tarry lamps,
    wherein at least parts or all of the windows for tarry lamps are located in an outside of the front cover by constructing a front cover portion between the top face and left-hand side face of the front cover, and a front cover portion between the top face and right-hand side face of the front cover as inclined planes respectively.

2. The television lens apparatus according to claim 1, wherein the windows for tarry lamps are colored transparent plates arranged aslant.

3. The television lens apparatus according to claim 1, wherein the windows for tarry lamps include a colored transparent plate flush with the top face of the body cover, colored transparent plates flush with the side faces of the body cover, and a colored transparent plate flush with the front face of the body cover.

4. The television lens apparatus according to claim 1,
    wherein handle sections protruding inside the body cover are provided in sides of the body cover respectively, and
    wherein the luminous bodies are provided in positions in which the luminous bodies do not interfere the handle sections when the cover is detached from or attached to the lens body.

5. The television lens apparatus according to claim 2,
    wherein handle sections protruding inside the body cover are provided in sides of the body cover respectively, and
    wherein the luminous bodies are provided in positions in which the luminous bodies do not interfere the handle sections when the cover is detached from or attached to the lens body.

6. The television lens apparatus according to claim 3,
    wherein handle sections protruding inside the body cover are provided in sides of the body cover respectively, and
    wherein the luminous bodies are provided in positions in which the luminous bodies do not interfere the handle sections when the cover is detached from or attached to the lens body.

7. The television lens apparatus according to claim 3,
    wherein luminous body supporting sections which have luminous body mounting surfaces approximately parallel to the windows for tarry lamps are provided on an outer peripheral surface of the lens body, and wherein the luminous bodies are mounted on the luminous body mounting surfaces.

8. The television lens apparatus according to claim 1, further comprising reflectors which are provided on the outer peripheral surface of the lens body near the luminous bodies and are used for reflecting light emission of the luminous bodies to the windows for tarry lamps.

9. The television lens apparatus according to claim 2, further comprising reflectors which are provided on the outer peripheral surface of the lens body near the luminous bodies and are used for reflecting light emission of the luminous bodies to the windows for tarry lamps.

10. The television lens apparatus according to claim 3, further comprising reflectors which are provided on the outer peripheral surface of the lens body near the luminous bodies and are used for reflecting light emission of the luminous bodies to the windows for tarry lamps.

11. The television lens apparatus according to claim 4, further comprising reflectors which are provided on the outer peripheral surface of the lens body near the luminous bodies and are used for reflecting light emission of the luminous bodies to the windows for tarry lamps.

12. The television lens apparatus according to claim 5, further comprising reflectors which are provided on the outer peripheral surface of the lens body near the luminous bodies and are used for reflecting light emission of the luminous bodies to the windows for tarry lamps.

13. The television lens apparatus according to claim 6, further comprising reflectors which are provided on the outer peripheral surface of the lens body near the luminous bodies and are used for reflecting light emission of the luminous bodies to the windows for tarry lamps.

14. The television lens apparatus according to claim 7, further comprising reflectors which are provided on the outer peripheral surface of the lens body near the luminous bodies and are used for reflecting light emission of the luminous bodies to the windows for tarry lamps.

* * * * *